United States Patent Office 2,890,775
Patented June 16, 1959

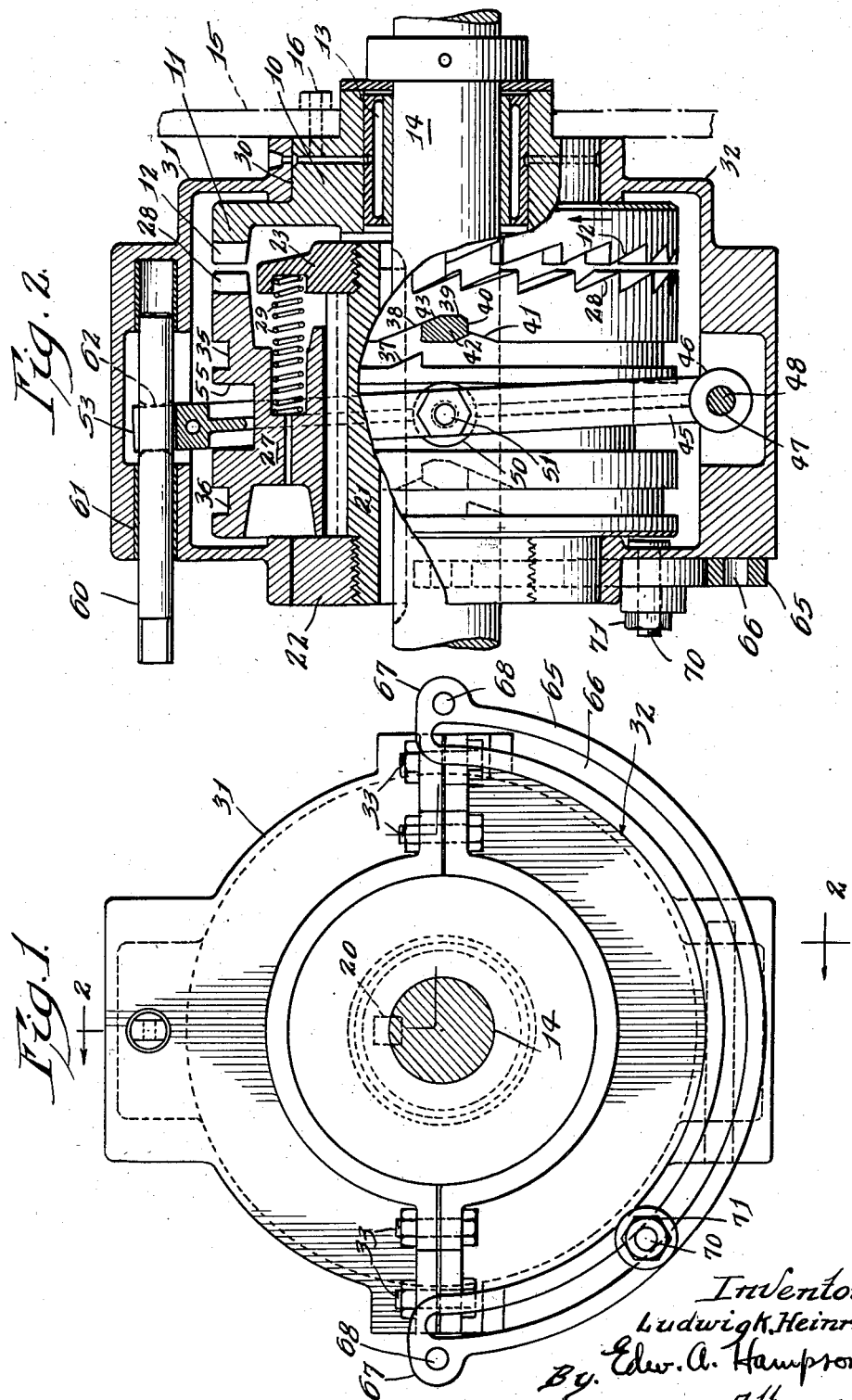

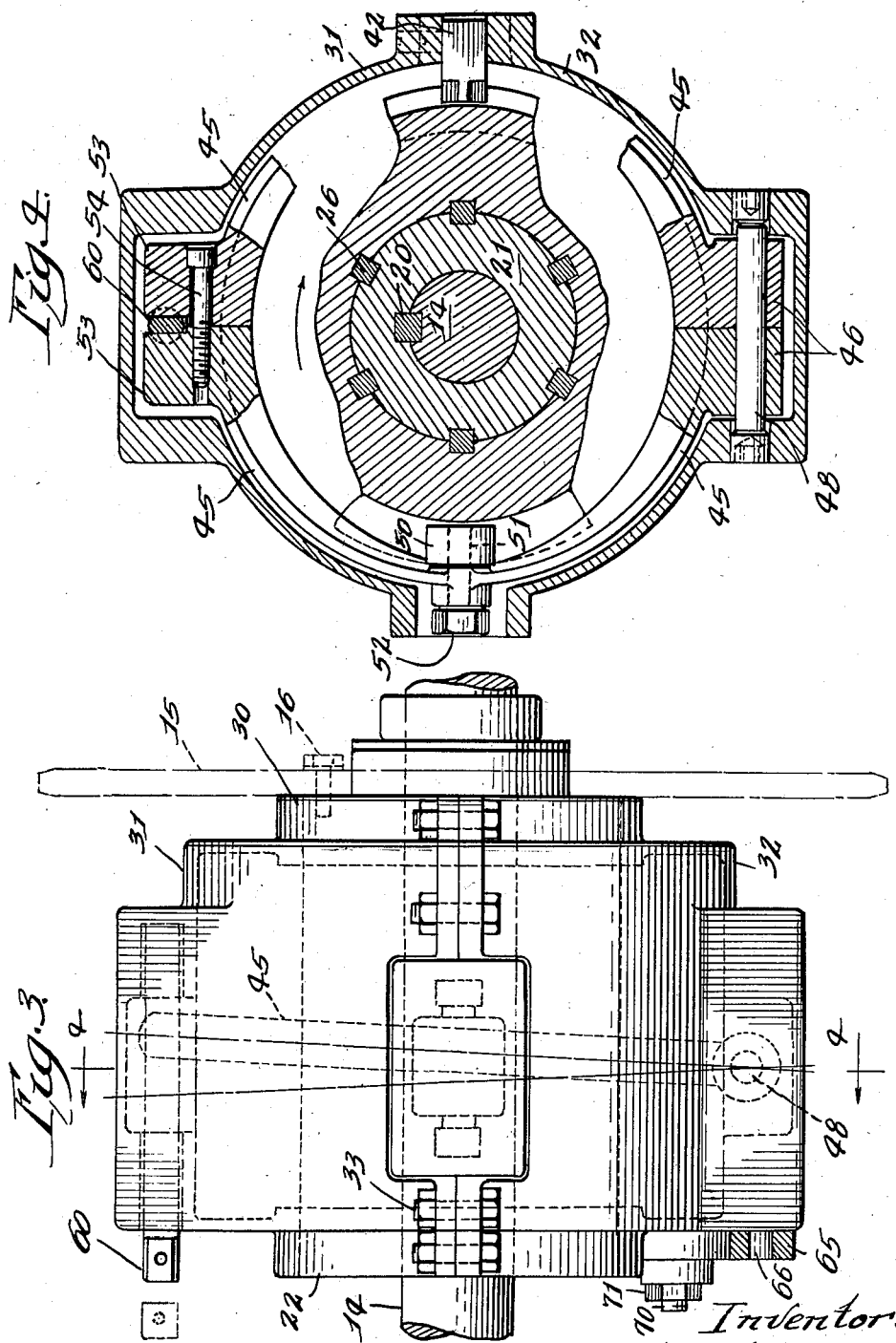

2,890,775

AUTOMATIC PRECISION CLUTCH

Ludwig K. Heinrich, Chesterton, Ind., assignor to The Celotex Corporation, Chicago, Ill., a corporation of Delaware Application May 10, 1954, Serial No. 428,440

7 Claims. (Cl. 192—33)

This invention deals with what might be termed a "specific" function clutch device. It is particularly for use in connection with a repetitive manufacturing operation occurring within a continuously operating production apparatus; that is, where, in the course of the operation of the production apparatus, there is re-occurrently required a precise operation which is intermittent. As an example of a specific use for the clutch mechanism hereof, such may be employed for operating a cut off mechanism for consecutively cutting from a continuously manufactured board, or the like, commercial board units of a specific desired length. In such a use the board, which is continuously produced through suitable devices, initiates the operation of the clutch for driving a cut off mechanism for severing individual boards. By the use of the clutch hereof the impressed operation is initiated from a precise point, through a precise cycle and then discontinued and then repeated, as required, as, for example, operating a cut off device to cut a standard 8 foot length of board from an endlessly, continuously manufactured product such as gypsum board, fiberboard, or the like.

The particular object of the invention is to provide a precision clutch which, when its cycle is initiated, operates from a uniformly fixed point, through a precise cycle, whereupon operation is discontinued until again initiated for operation from the such precise starting point through the fixed cycle. In addition to the primary object of the invention, it is, of course, an objective to provide such a clutch device of a simple form and of such construction that the device may be relatively cheaply manufactured.

Briefly, the construction involves meshing toothed clutch members, one of which is under the control of a cam device, whereupon, when the clutch is actuated to bring the toothed clutch elements into operating contact, the relationship or starting point of the operation so initiated will always start from the precise position and be operative through a precise cycle.

In the accompanying drawings,

Figure 1 is an end elevation of the clutch device;

Figure 2 is a section thereof taken on line 2—2 of Figure 1;

Figure 3 is an elevation taken at right angles to the showing of Figure 1; and

Figure 4 is a section taken on line 4—4 of Figure 3.

The clutch device, as illustrated, comprises a driving clutch member 10 formed with a clutch disc or face portion 11 provided with clutch teeth 12. This driving clutch member is mounted on suitable bearing 13 illustrated as a needle-bearing mounted on shaft 14 and relative to which the driving clutch member rotates. Mounted on the main body of the driving clutch member 10 there is suitably secured a sprocket or other suitable driving device 15, which may be secured thereto as by cap screws 16.

This driving clutch member, which has just above been described, is, it will be readily understood, a constantly running portion of the clutch, driven from the machine with which the clutch hereof is being used; that is, a suitable driving chain or the like driven from such machine and causing rotation of sprocket 15 will impart continuous rotation to driving clutch member 10 in synchronism with the operation of the main machine drive.

The intermittently operated portion or driven clutch portion of the clutch device hereof is also mounted on shaft 14 and keyed thereto as by key 20. This driven clutch portion of the device, being made up of a number of elements, will be described in connection with the various elements which go to make up this driven portion of the clutch device. That portion of the driven part of the clutch device actually keyed to shaft 14 by key 20 is merely an annular member on which is mounted other portions of the driven portion of the clutch and which annular member is identified by numeral 21. This annular member 21 is threaded at each end, and threaded collars 22 and 23 are mounted at each end of this annular member 21. The purposes of these collars mounted on the ends of annular member 21 will become apparent as the description of the device proceeds.

The outer periphery of annular member 21 is shown as provided with six equally spaced keys 26 which serve as slides and guides for the driven clutch member in order that it may be slid into and out of engagement with the driving clutch member 10. Mounted on annular member 21 there is provided the sliding driven clutch member which is suitably slid into and out of engagement with the driving clutch member 10.

The driven clutch member is designated generally by numeral 27 and is provided with key-ways or slide-ways such that when mounted on annular member 21 with a sliding fit, it will be suitably directed and restrained so that it can merely slide back and forth lengthwise along the such annular member, but always in fixed relation thereto due to the keys or slides 26 previously referred to. Driven clutch member 27 at one end is provided with clutch teeth 28, complemental to the driving teeth 12 to the driving clutch member. Between one of the end collars 23 mounted on annular member 21 and the body 27 of the driven clutch member, there is provided a compression spring 29 which, as shown, may be at its ends positioned in suitable bores in the respective parts, and which spring, obviously, will serve to force driven clutch member 27 away from collar member 23 provided no other and overcoming force is being applied to the device. Thus, as is obvious, particularly upon viewing Fig. 2 of the drawing, the two clutch portions, that is, the driving and driven members, are normally biased apart so that the clutch is inactive to drive any member or device which may be connected to the clutch shaft 14.

For activating the clutch to drive a member or device connected to clutch shaft 14, there is provided a lever device which is mounted in a housing which encloses the mechanism of the clutch device as so far described, including, of course, other detail constructions thereof, as will be subsequently described in detail. This housing member is mounted on the periphery of collar member 22 at one end, and on a shoulder 30 provided on a portion of driving clutch member 10, as is clearly apparent, particularly in Fig. 2 of the drawing. This housing member is a generally cylindrical structure of what might be termed a U-shape section, and which, as shown, comprises two separate, substantially similar portions 31 and 32 which, after they are applied, are bolted together as by bolts 33 to form a housing enclosing the operational elements of the clutch device.

For activating and controlling the clutch operation, the driven clutch member 27 is provided with two spaced grooves circumferentially thereof and designated by numerals 35 and 36. These grooves 35 and 36 will be referred to as "cam" grooves since cam faces are provided therein, as will be described. Since these cam grooves 35 and 36 are identical except that the cam faces therein are displaced 180°, description of one will constitute a description of both excepting that it must be kept in mind that these cam faces, being displaced 180°, are relatively reversed. In cam groove 35 there is provided a deflecting cam face where the walls of the cam groove are deflected at an angle of about 30°. Such deflection of the walls of the cam groove provide on one side of the groove a cam face 37, the function of which will be subsequently described. Opposite cam face 37, the other wall of the cam groove 35 is likewise angularly displaced but elongated with respect to cam face 37, designated by numeral 38, with at its end a short portion 39 parallel to the cam slot wall, a portion 40 extending at right angles thereto and an angularly relieved portion 41 rejoining the base of the cam groove. As heretofore referred to, cam groove 36 is provided with similar cam faces, as is shown particularly in Fig. 2 of the drawing and which, differing only in that such cam faces are displaced 180° from those described and are reversed with respect thereto, are believed not to require specific description.

Cooperating with cam grooves 35 and 36 there are provided detents 42 which are mounted in and secured in the casing 31—32. These detent members 42 at their inner ends project into the cam grooves 35 and 36, just previously referred to. The inner ends of these detents which extend into the cam grooves are basically of rectangular cross section but, as will be apparent, particularly upon viewing Fig. 2 of the drawing, detent 42 at one side face is relieved or chamfered from its upper edge, for about two-thirds of its length, at an angle complemental to the angularity of the cam portion of cam groove 35, as at 43, and the other side face is slightly relieved from the lower edge for about one-third of the height of the detent at approximately the same angularity.

For operating the clutch device hereof there is provided a pivoted fork structure which is in fact of substantially hoop or band form, identified by numeral 45, and is provided with a suitable boss 46 at its lower portion, having a central opening 47 therethrough whereby the member 45 may be pivotally mounted on pin 48 secured in the lower housing case 32. Substantially centrally of band member 45 there are mounted thereon rollers 50 mounted on short stub shaft members 51, which may comprise, for example, the suitably machined end portions of cap screws 52 extending through and threadedly engaged with band member 45. At its upper end the band member is provided with an upstanding portion or boss 53, and by means of which the band member 45 may be manipulated to swing it back and forth on its pivot 48. It will, of course, be understood that in order that band member 45 may be assembled in the structure, it is preferably split medially on a vertical diameter, and that provision may be made for securing the two parts together as by means of a bolt member 54 extending through a suitable bore in one of the half portions and threadedly engaging in a similarly threaded bore in the other half of the band member.

In driven clutch member 27 there is provided a third groove which is shown as intermediate the previously referred to cam grooves 35 and 36, which intermediate groove is identified by numeral 55. This groove 55 has a width very slightly greater than the diameter of rollers 50, and rollers 50 are received therein whereupon it is evident that as operating band or fork member is swung slightly on its pivot pin 48, forwardly or back, that driven clutch member 27 will be moved back and forth on annular member 21, on which it is mounted.

For actuating the operating fork or band member 45, there is provided a plunger member 60 which is mounted in a suitable bore 61 in the upper case member 31. This plunger member 60 is provided more or less centrally thereof with an opening or recess 62 extending therethrough and in which opening 62 there is received the boss 53 previously referred to, as provided at the top of operating fork or band 45. According to the description which has preceded, it is obvious that by forward and backward movement of plunger 60 the operating fork or band member 45 will be swung slightly on its pivot pin 48, and that through the co-action of rollers 50 thereon with groove 55 driven clutch member 27 will be correspondingly forced forward to bring the clutch teeth 28 thereof into engagement with the clutch teeth 12 of driving clutch member 10.

In connection with one part of the case of the device shown as associated with the lower part 32 thereof, there is provided an arcuate member 65 on which there is an arcuate slot 66. This arcuate member 65 is provided with suitable bosses, as 67, having openings therethrough, 68, whereby by means of screws or bolts or the like passing through such openings 68 the arcuate member 66 may be mounted to any suitable adjacent stationary structure. The case portion 32 is provided with a bolt 70 or the like passing through a side wall thereof and extending through arcuate slot 66, by tightening nut 71 on the such bolt 70 the case portion 32 may be secured with respect to arcuate member 66.

The details of the construction having been fully hereabove set out, the operation of the device is as follows:

Sprocket 15 being continuously driven, as was heretofore referred to, it imparts continuous rotation to the driving clutch member 10 having clutch teeth 12 thereon. When it is desired that the clutch hereof be actuated, as, for example, upon the contacting of a limit switch, by the forward edge of a board product being manufactured, suitable devices actuated by such limit switch press plunger 60 forwardly which, in turn, rocks operating fork or band 45 on its pivot, with the consequence that the rollers 50 thereon, acting in groove 55, advance the driven clutch member 27 against the action of spring 29 to engage clutch teeth 28 of the driven clutch member with clutch teeth 12 of the driving clutch member. It will be apparent that as the driven clutch member 27 is advanced, as just aforesaid, that detent 42 is disengaged from face 40 of the cam portion of groove 35, and the groove 35 moves in line with detent 42 and thus the driven clutch member 27 is in position to be revolved due to the engagement of the respective clutch teeth 28 and 12. Driven clutch member 27 as it revolves will, of course, through its connection with shaft 14, cause shaft 14 to revolve.

As the driven clutch member 27 revolves through substantially one complete revolution clockwise, cam face 37 of cam groove 35 will contact the lower relieved side edge portion of detent 42, and due to the angularity of cam face 37, this contact will force the driven clutch member back out of its operating connection with driving clutch member 10 and will bring face 40 of the cam portion into position to be contacted by the lower face of the detent to positively stop further revolution of driven clutch member 27. It is to be realized, of course, that in describing the action of the cam and detent in initiating and stopping revolution of driven clutch member 27, that this has been described only with respect to the one such cam and detent; whereas, as has been pointed out, this action likewise occurs similarly with respect to the other cam portion and detent, which have been described as displaced 180° and, of course, reversed due to such displacement.

It should be obvious that in accordance with the mode of operation of the device which has just above been described, that upon actuation of the clutch device hereof the driven clutch member will be actuated to revolve exactly one revolution and then disengage, and that this exact operation must result due to the contacting at a fixed point of the lower face of detent 42 by cam face 40, whereby a positive stop results. Also it should be obvious that upon the next actuation of the clutch device, that the clutch is actuated from this positive stop position through another exact single revolution actuation, and so on, as often as the clutch is actuated.

Should the device which is actuated from shaft 14 of the clutch not be exactly coordinated with the operations being carried out, adjustment with respect thereto may be made by a loosening of nut 71 on the bolt 70 extending through the fixed arcuate slot 66, and the entire clutch mechanism may be suitably annularly adjusted to bring the operation into proper coordination and then clamped in such position by tightening down nut 71.

It is understood, of course, that the mechanisms with which such clutch may be associated and the devices for actuating clutch are not in fact parts of the invention hereof, but since it is felt that some comment with respect thereto might assist in an understanding of the application of the clutch hereof, an effort will be made to briefly connect such devices and mechanisms.

We may assume that the clutch hereof is used to revolve a cutter knife severing uniform lengths of board on a machine manufacturing a board form product as a continuous operation. The cutter knife, of course, will be suitably positioned along the production line and connected to shaft 14 of the clutch to be actuated to cut off successive boards. A limit switch will be provided to be contacted by the forward edge of the continuously produced board, and this limit switch, either through suitable linkage or an electrically operated solenoid, or the like, will, when contacted by the forward edge of the board, cause actuation of plunger 60 of the clutch. Actuation of plunger 60 initiates a single revolution operation of the clutch, as has been described in detail, to actuate the cutter device to accurately sever a board form sheet from the continuously produced sheet. A cyclic operation of the clutch causes disengagement of the clutch, as has been described, with consequent return of plunger 60 to its initial position to be again actuated, which will occur when the forward edge of the continuously produced sheet has been again advanced to contact the limit switch, whereupon the actuation of the cutter, as described, will be repeated.

The invention hereof having been described in detail, what I claim is:

1. An automatic precision clutch comprising a driving clutch portion and a driven clutch portion, each thereof provided with interengaging means, means biasing the clutch portions out of engagement, means shifting the driven clutch portion longitudinally against said bias and engaging the clutch portions, cam means on the driven clutch portion, the cam means including a cam rise portion as a part thereof and a fixed detent cooperating therewith, continuously engaged by the cam, the cam rise portion of the cam means on engagement thereof with the fixed detent longitudinally shifting the driven clutch portion whereby the clutch portions are disengaged.

2. An automatic precision clutch comprising a driving clutch portion and a driven clutch portion, each thereof provided with interengaging means, means biasing the clutch portions out of engagement, means shifting the driven clutch portion longitudinally against said bias and engaging the clutch portions and cam means upon predetermined rotation of the engaged clutch disengaging the driving connection of the clutch portions, such cam means and an associated stop provided on the driven clutch portion and a fixed detent in continuous engagement therewith, the cam provided with a cam face in cooperation with the detent shifting the driven clutch portion longitudinally to engage the stop and detent.

3. A precision clutch comprising a driven shaft, a driving clutch portion rotatably mounted thereto, a driven clutch portion slidably splined thereto and slidable into and out of engagement with the driving clutch portion, an annular housing mounted to the said shaft angularly adjustable thereon and housing the clutch device, the driven clutch portion and said housing having cooperating cam and detent structures mounted thereto, the cam having an inclined face and in cooperation with the detent longitudinally shifting the driven clutch portion, means securing said housing against rotation and means mounted to said driving clutch portion for rotating said driving clutch portion.

4. A precision clutch comprising a driven shaft, a driving clutch portion rotatably mounted thereto, a driven clutch portion mounted on and secured against rotation relative the shaft, connecting means interposed between one clutch portion and the shaft and providing for relative longitudinal movement, an annular housing mounted to the said shaft angularly adjustable thereon, a detent mounted to said housing and a cam track and associated stop on a clutch portion, the cam track having a portion thereof inclined and in cooperation with the detent longitudinally shifting the clutch portion and positioning the stop thereon to be arrested by the detent.

5. The clutch construction as defined in claim 4 and including an abutment secured to the shaft and a spring mounted between such abutment and the longitudinally movable clutch portion and biasing the clutch members in disengaged relation.

6. The clutch construction as defined in claim 5 and including means mounted in the annular housing and upon actuation shifting a clutch portion longitudinally against the force exerted by the biasing spring and means mounted to and receiving the driving clutch portion.

7. A precision clutch comprising a driven shaft, a driving clutch portion rotatably mounted thereto, a driven clutch portion slidably splined thereto and slidable into and out of engagement with the driving clutch portion, an annular housing mounted to the said shaft angularly adjustable thereon and housing the clutch device, the driven clutch portion and said housing having cooperating cam and detent structures mounted thereto, the cam having an inclined face and in cooperation with the detent longitudinally shifting the driven clutch portion, the annular housing adjustable angularly about its axis and means thereon securing the housing in angular adjusted position to an external fixed member.

References Cited in the file of this patent

UNITED STATES PATENTS

| | | |
|---|---|---|
| 1,153,831 | Slentz | Sept. 14, 1915 |
| 1,481,299 | Martin | Jan. 22, 1924 |
| 2,226,917 | Zeruneith | Dec. 31, 1940 |
| 2,742,125 | Borchardt | Apr. 17, 1956 |

FOREIGN PATENTS

| | | |
|---|---|---|
| 155,662 | Germany | Nov. 17, 1904 |